United States Patent
Wang (10) Patent No.: US 8,366,154 B2
(45) Date of Patent: Feb. 5, 2013

(54) WATER PIPE CONNECTOR

(76) Inventor: Cheng-An Wang, Lu Kang Town (TW)

( * ) Notice: Subject to any disclaimer, the term of this patent is extended or adjusted under 35 U.S.C. 154(b) by 0 days.

(21) Appl. No.: 13/160,924

(22) Filed: Jun. 15, 2011

(65) Prior Publication Data

US 2012/0319401 A1    Dec. 20, 2012

(51) Int. Cl.
*F16L 37/18*    (2006.01)
(52) U.S. Cl. .......................................... 285/314; 285/86
(58) Field of Classification Search ............... 285/85, 285/86, 314, 315
See application file for complete search history.

(56) References Cited

U.S. PATENT DOCUMENTS

| | | | | |
|---|---|---|---|---|
| 4,219,222 A | * | 8/1980 | Brusadin | 285/315 |
| 4,632,437 A | * | 12/1986 | Robson et al. | 285/314 |
| 4,681,350 A | * | 7/1987 | Gaita | 285/315 |
| 4,796,856 A | * | 1/1989 | Munini | 285/315 |
| 6,199,913 B1 | * | 3/2001 | Wang | 285/315 |
| 7,021,669 B1 | * | 4/2006 | Lindermeir et al. | 285/86 |
| 7,185,923 B2 | * | 3/2007 | McNeil et al. | 285/86 |
| 7,543,858 B1 | * | 6/2009 | Wang | 285/314 |
| 7,900,972 B2 | * | 3/2011 | Wang et al. | 285/315 |
| 8,029,024 B2 | * | 10/2011 | Guest | 285/314 |
| 8,181,997 B2 | * | 5/2012 | Wang | 285/314 |

* cited by examiner

*Primary Examiner* — David E Bochna
(74) *Attorney, Agent, or Firm* — Egbert Law Offices, PLLC (57) ABSTRACT

A water pipe connector apparatus has a main body and a sleeve. A stop surface is formed at a top of the main body and a plurality of limiting blocks are formed on an inner wall of the sleeve. The sleeve has a plurality of oblique thrust pads arranged alternately with the limiting blocks on the inner wall of the sleeve. The sleeve has an abutment member positioned at a top of the inner wall thereof. The sleeve shifts longitudinally when the thrust pads are aligned with guide lugs of the main body. The sleeve is fixed when the limiting blocks are aligned with the guide lugs.

2 Claims, 8 Drawing Sheets

WATER PIPE CONNECTOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a water pipe connector, and more particularly to an innovative one which allows for installation of a limiting structure correspondingly to the sleeve and main body.

2. Description of Related Art Including Information Disclosed Under 37 CFR 1.97 and 37 CFR 1.98.

The water pipe connector of the present invention is generally used as a fitting to connect a water sprayer with a water pipe or connect water pipes in gardening or vehicle flushing.

Said water pipe connector is structurally designed in a manner to focus on convenient and quick positioning and release. So, the relevant structural design is of utmost importance.

According to the structural design of conventional water pipe connector, the combined positioning and release is generally realized through axial displacement of a sleeve. The users could apply force to withdraw the sleeve, and open the preset claw to release the male joint preset at the end of the water pipe. Otherwise, if no force is applied to the sleeve, the sleeve could be reset automatically through an elastic resetting mechanism, thus realizing quick combination and release effects.

There are currently available a variety of elastic resetting mechanisms for automatic resetting of the sleeve, since such a compact mechanism can be applied to a space-saving water pipe connector. Hence, a technical problem is how to design structurally the compact elastic resetting mechanism with desired reliability and locking effect.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The enhanced efficacy of the present invention is as follows:

The technical features of the "water pipe connector" of the present invention lie in that, a limiting structure is set correspondingly to the sleeve and main body, and comprises of a stop flange and limiting blocks. Since the limiting blocks and oblique thrust pads are arranged at interval, when the sleeve is rotated by the user, and the oblique thrust pads are aligned with the guide lugs, the sleeve could shift axially. When the sleeve is rotated reversely by the user, and the limiting blocks are aligned with the guide lugs, the abutting portion of the limiting block is supported by the stop flange of the guide lug, such that the sleeve is in a limited state. With this innovative structural configuration, the water pipe connector of the present invention could be simplified structurally with more stable guiding function. Also, with the arrangement of the limiting structure, the water pipe connector could be positioned more stably without being easily toggled for improved applicability.

The improvements brought about by this invention are as follow:

Based on the structural configuration wherein a bulge is protruded from said stop flange, when the sleeve is rotated to make the abutting portion of the limiting block bypass forcibly the bulge, a snapping sound is generated and the sleeve is put in a movable or limited state. So, the user could judge the operating condition of the water pipe connector according to the snapping sound.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

FIGS. 1, 2, 3, 6 and 7 depict preferred embodiments of water pipe connector of limiting structure of the present invention, which, however, are provided for only explanatory objective for patent claims.

Said water pipe connector A comprises a main body 10 and a sleeve 20. An axial water hole 103 is set in the center of the main body 10, an external threaded section 101 and multiple teeth 102 are set at the bottom, and the top comprises of a reducing flanged pipe 11 and some radial through-holes 12 arranged at interval. A flange ring 110 is set at bottom of the reducing flanged pipe 11, which is connected to a plurality of elastic claws 13 and a plurality of guide lugs 14 extended upwards. The elastic claws 13 are located between the guide lugs 14, and every elastic claw 13 comprises of a fixture block 132, a recessed section 133 and a rack 134. The bottom of the elastic claw 13 is abutted onto the flange ring 110 of the reducing flanged pipe 11. The fixture block 132 of the elastic claw 13 is protruded separately into radial through-hole 12 of the reducing flanged pipe 11. Said fixture block 132 is protruded into said radial through-hole 12 for locking and positioning of the water pipe male joint 50 inserted in the axial water hole 103 of the main body 10 (disclosed in FIG. 4). Moreover, a recessed groove 135 (marked in FIG. 3) is formed between the fixture block 132 of the elastic claw 13 and internal side of the recessed section 133. The recessed groove 135 is used for bracing elastically the fixture block 132. The sleeve 20 is movably set onto the periphery of the reducing flanged pipe 11 of the main body 10, and an abutting flange 21 is set at top of the internal wall 201. A few oblique thrust pads 22 are formed on the internal wall 201 of the sleeve 20, and abutted correspondingly to the external guide surface 142 of the guide lug 14. Of which there is a spacing W between the guide lug 14 and the reducing flanged pipe 11 (disclosed in FIG. 4). When the oblique thrust pad 22 is abutted onto the external guide surface 142 of the guide lug 14, the sleeve 20 is supported and shifted downwards to a preset stroke. A limiting structure 30 is set correspondingly to the sleeve 20 and main body 10

The limiting structure 30 comprises a stop flange 31, formed at top of the guide lug 14. A plurality of limiting blocks 32 are formed on the internal wall of the sleeve 20. An abutting portion 321 is defined at one end. The limiting blocks 32 and oblique thrust pads 22 are arranged at interval. The limiting block 32 is arranged clockwise in relation to the oblique thrust pad 22 of the sleeve 20. When the sleeve 20 is rotated by the user and the oblique thrust pads 22 are aligned with the guide lugs 14, the sleeve 20 could shift axially. When the sleeve 20 is rotated reversely by the user and the limiting blocks 32 are aligned with the guide lugs 14, the abutting portion 321 of the limiting block 32 is supported by the stop flange 31 of the guide lug 14, such that the sleeve 20 is limited.

Figure 8:
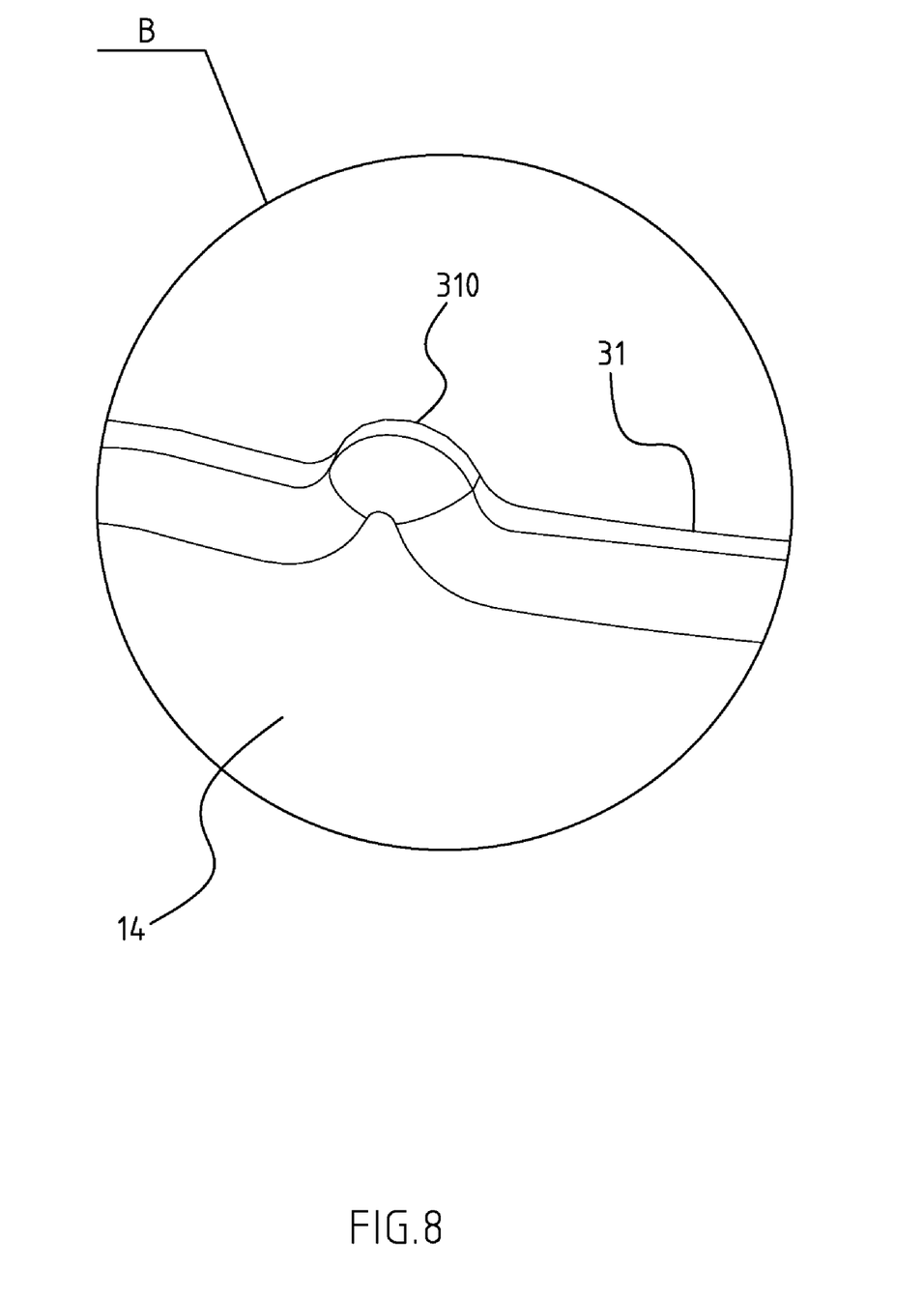
FIG. 8 is an enlarged view of FIG. 2B.

Referring to FIG. 8, a bulge 310 is protruded from the stop flange 31. When the sleeve 20 is rotated to make the abutting portion 321 of the limiting block 32 bypass forcibly the bulge 310, a snapping sound is generated and the sleeve 20 is put in a movable or limited state. So, the user could judge the operating condition of the water pipe connector A according to the snapping sound.

Figure 6:
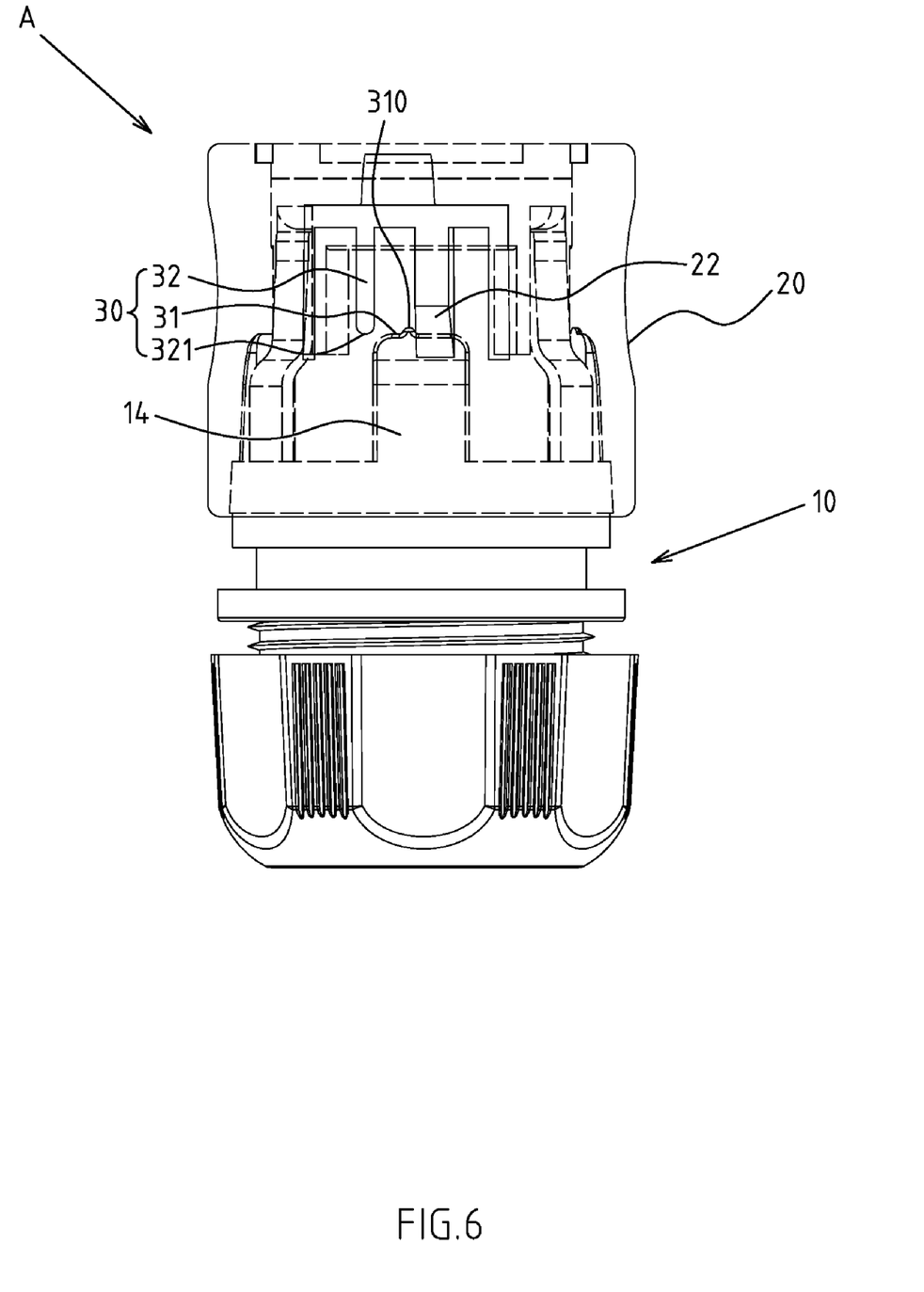
FIG. 6 is a schematic view of the present invention wherein the sleeve can shift axially (i.e. the oblique thrust pads are aligned with the guide lugs).
Figure 7:
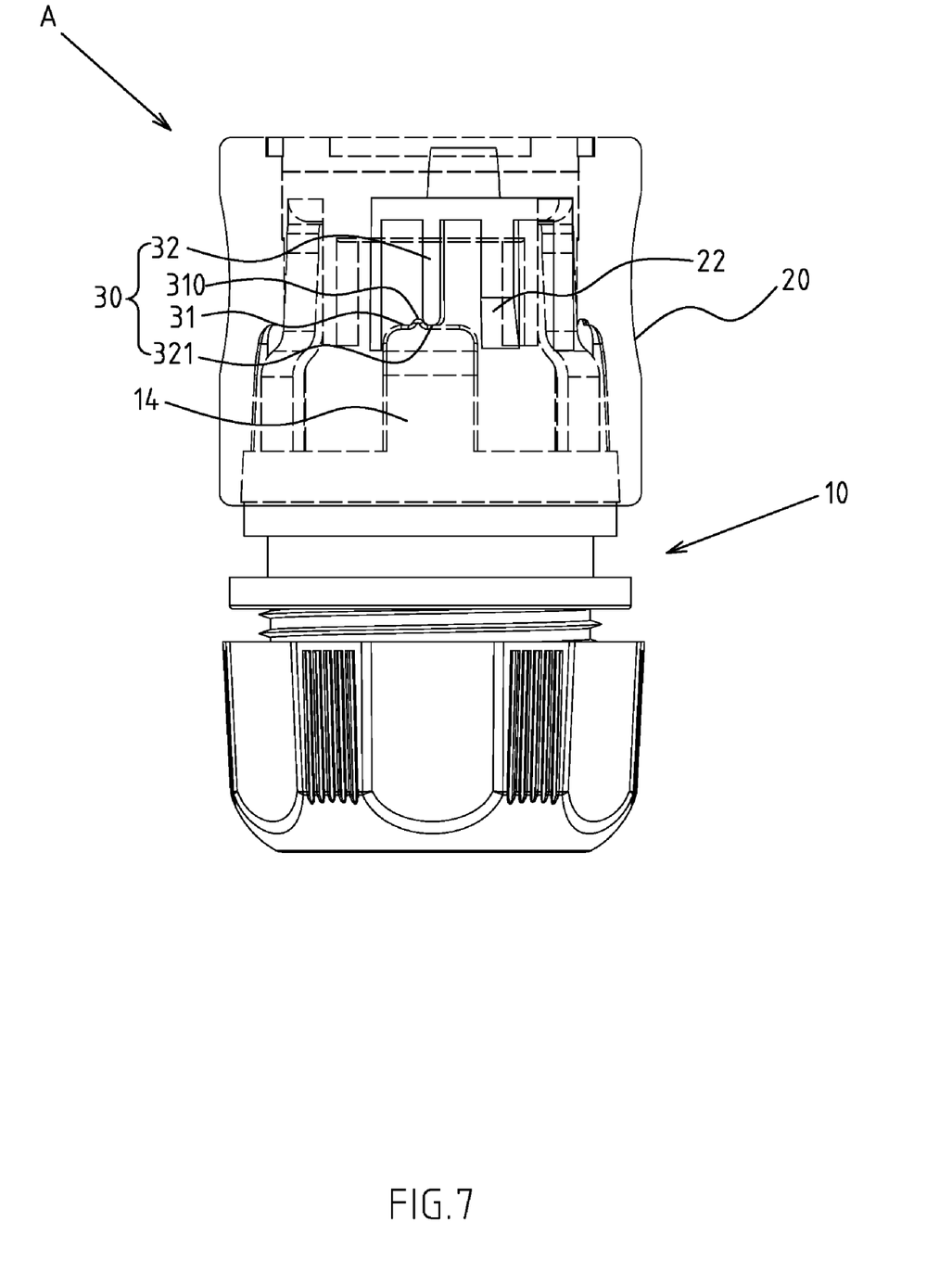
FIG. 7 is a schematic view of the present invention wherein the sleeve is in a limited state (i.e. the limiting blocks are aligned with the guide lugs).

Based on above-specified structure, the present invention is operated as follows:

When the sleeve 20 is rotated and the oblique thrust pads 22 are aligned with the guide lugs 14, the sleeve 20 could shift axially (disclosed in FIG. 6). When the water pipe connector A is locked at existing water pipe male joint 50, and as the limiting block 32 is arranged clockwise in relation to the oblique thrust pad 22 of the sleeve 20, the sleeve 20 is rotated counterclockwise by the user. Then, the limiting block 32 is aligned with the guide lug 14, such that the abutting portion 321 of the limiting block 32 is supported by the stop flange 31 of the guide lug 14 (disclosed in FIG. 7), and the user cannot apply force to toggle the sleeve 20. This could improve the locking stability, and prevent disengagement of the water pipe male joint 50 when the water pipe connector A is locked securely onto the water pipe male joint 50.

Figure 1:
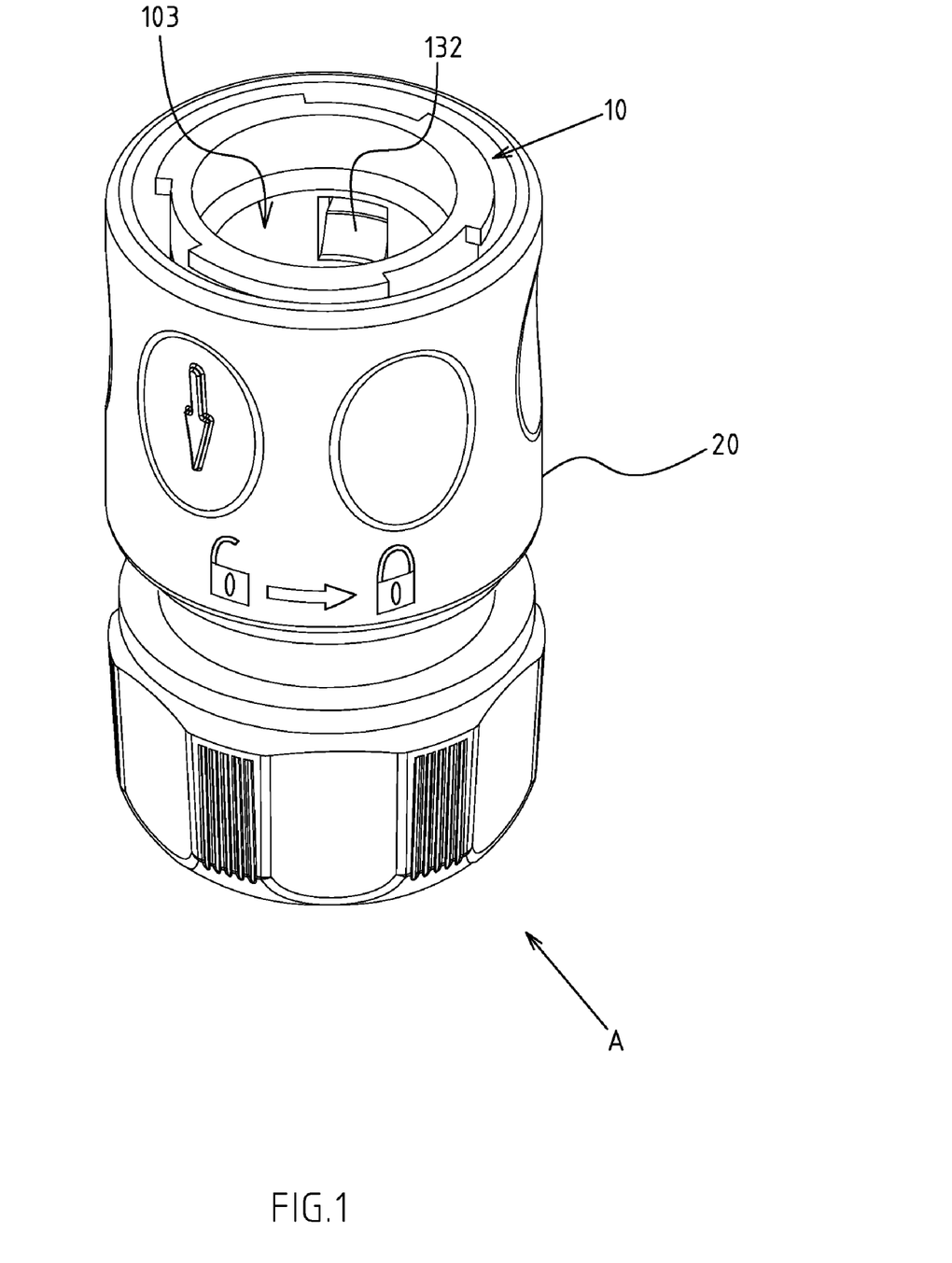
FIG. 1 is an assembled perspective view of the preferred embodiment of the present invention.
Figure 2:
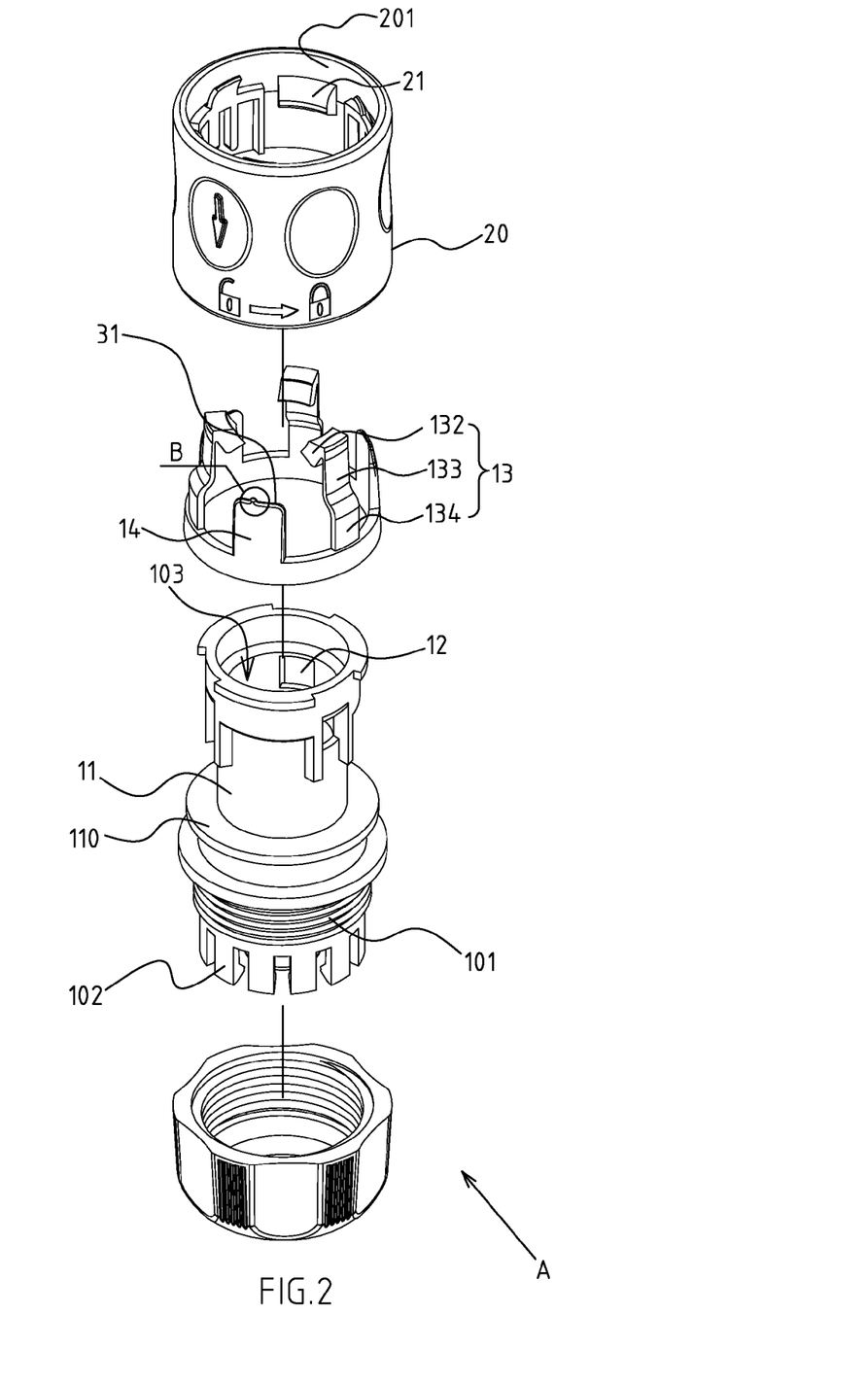
FIG. 2 is an exploded perspective view of the preferred embodiment of the present invention.
Figure 3:
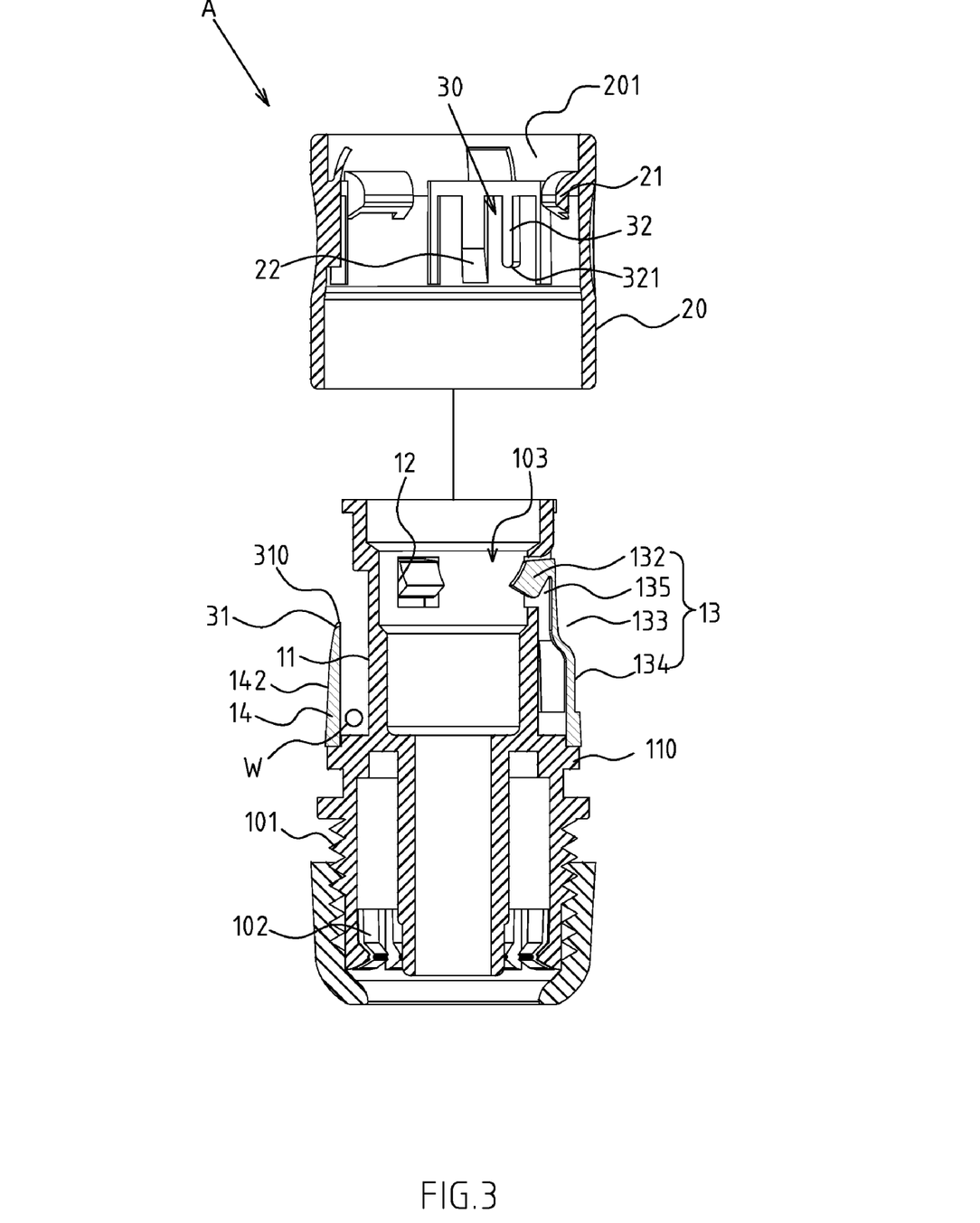
FIG. 3 is an exploded sectional view of the preferred embodiment of the present invention.
Figure 4:
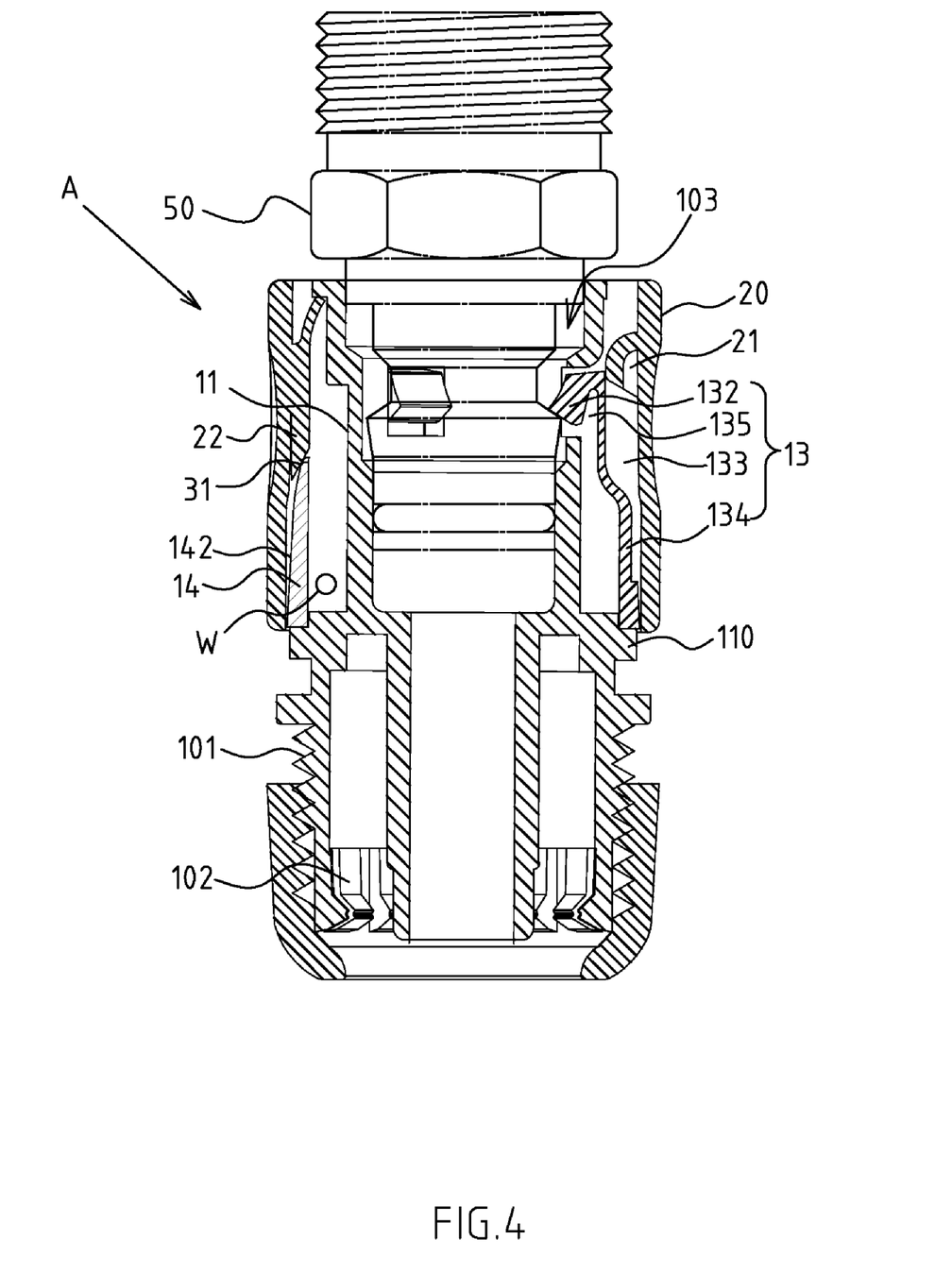
FIG. 4 is a schematic view of the present invention wherein the guide lugs are not supported by the oblique thrust pads.
Figure 5:
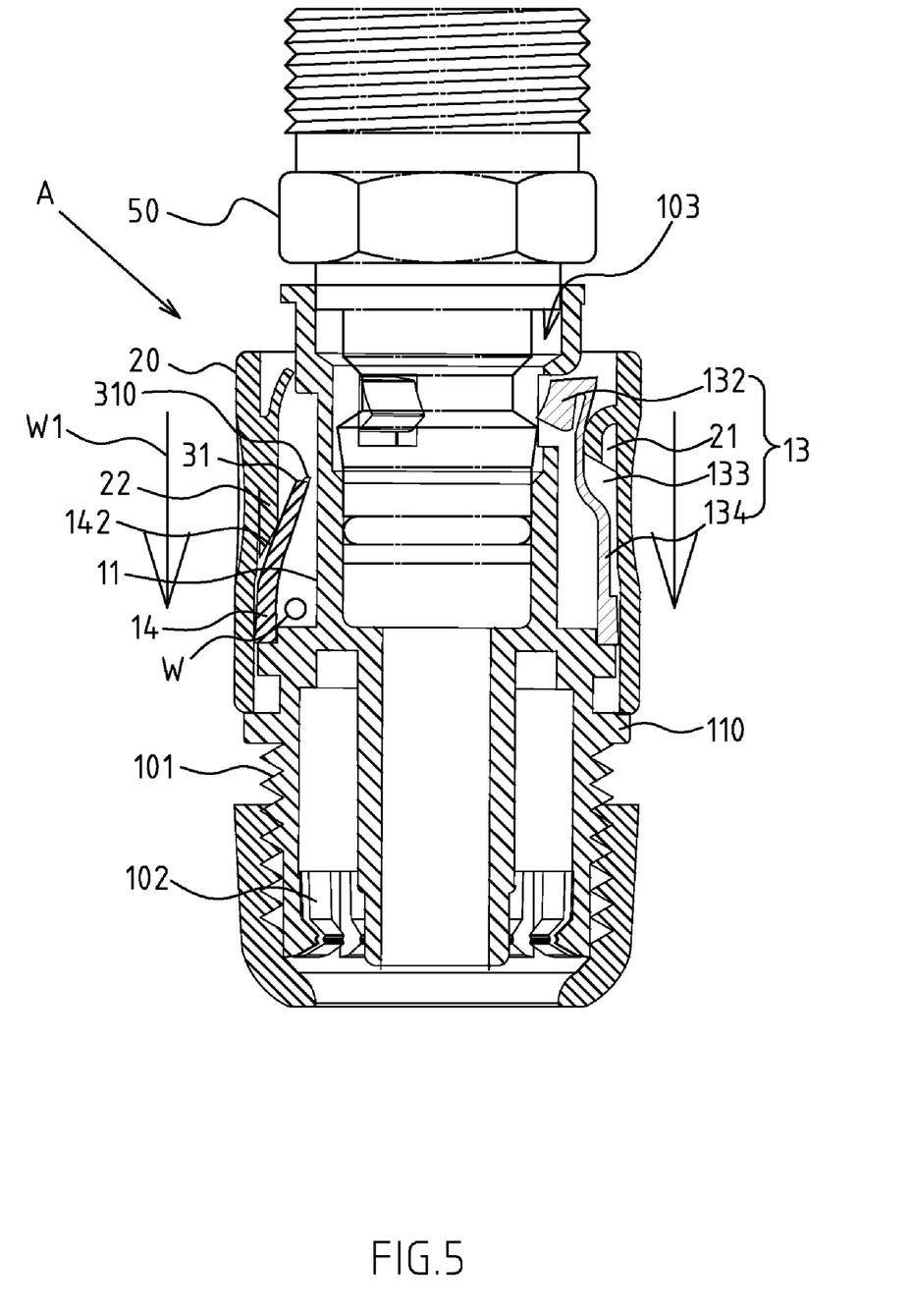
FIG. 5 is an operation view of the preferred embodiment of the present invention.

The operating principle of said water pipe connector A is described hereto. Referring to FIG. 4, when the water pipe connector A is locked at the water pipe male joint 50, the external side of the fixture block 132 of said elastic claw 13 is abutted by said abutting flange 21, so the fixture block 132 is locked to position securely the water pipe male joint 50. When the sleeve 20 shifts downwards under the force applied by the user, the abutting flange 21 is shifted downwards simultaneously and aligned with the recessed section 133 below the fixture block 132. In such a case, the user could remove the water pipe male joint 50, as shown in FIG. 5. While the sleeve 20 shifts downwards, the external guide surface 142 of said guide lug 14 will swing towards the spacing W under the oblique guiding action of the oblique thrust pad 22 (disclosed in FIGS. 4 and 5), so as to accumulate the resetting elastic force. When the force applied by the user is released, the sleeve 20 will move upwards with the resetting of the oblique thrust pad 22.

I claim:

1. A water pipe connector apparatus comprising:
a main body having a flanged pipe at a top thereof, said flanged pipe having a plurality of through-holes extending radially through a wall thereof, said main body having a plurality of elastic claws and a plurality of guide lugs extending upwardly and arranged in alternating and spaced relationship around an exterior of said flanged pipe, each of said plurality of guide lugs having a stop flange formed at a top thereof, said stop flange having a bulge protruding outwardly therefrom in a location generally centrally between sides of said stop surface; and
a sleeve slidably and rotatably positioned around said flanged pipe, said sleeve having an abutting flange positioned at a top of an inner wall thereof, said sleeve having a plurality of oblique thrust pads and a plurality of limiting blocks formed on said inner wall thereof, each of said plurality of limiting blocks having an abutment surface formed at an end thereof, the oblique thrust pads and the limiting blocks being arranged individually and alternately in spaced relation around said inner wall of said sleeve, said sleeve shifting longitudinally axially when said sleeve is rotated in one direction such that the oblique thrust pads are aligned respectively with the guide lugs, said sleeve being fixed in position when said sleeve is rotated in an opposite direction such that the limiting blocks are respectively aligned with the guide lugs such that the abutting portion of the limiting block bears against the stop flange of the guide lug.

2. The water pipe connector apparatus of claim 1, the limiting block being arranged clockwise with respect to the oblique thrust pad.

* * * * *